Inventor
Donald O. Kocmich
By R. H. Wendt
Attorney.

Aug. 15, 1950 D. O. KOCMICH 2,518,906

VARIABLE ELECTRICAL RESISTANCE DEVICE

Filed Oct. 15, 1948 4 Sheets-Sheet 2

Inventor
Donald O. Kocmich
BY
R. H. Wendt
Attorney.

Aug. 15, 1950 D. O. KOCMICH 2,518,906

VARIABLE ELECTRICAL RESISTANCE DEVICE

Filed Oct. 15, 1948 4 Sheets-Sheet 3

Inventor
Donald O. Kocmich
By R. H. Wendt
Attorney.

Aug. 15, 1950

D. O. KOCMICH 2,518,906

VARIABLE ELECTRICAL RESISTANCE DEVICE

Filed Oct. 15, 1948

4 Sheets-Sheet 4

Inventor
Donald O. Kocmich
By R. H. Wendt
Attorney.

Patented Aug. 15, 1950

2,518,906

UNITED STATES PATENT OFFICE 2,518,906

VARIABLE ELECTRICAL RESISTANCE DEVICE

Donald O. Kocmich, La Grange, Ill.

Application October 15, 1948, Serial No. 54,769

4 Claims. (Cl. 201—57)

The present invention relates to variable electrical resistance devices, and is particularly concerned with such devices of the liquid type which will accurately translate into electrical variations small mechanical changes in force, motion, inertia, pressure, change of dimension or the like which are impressed upon the device.

One of the objects of the invention is the provision of an improved electro-mechanical liquid cell which employs an electrical conducting liquid as a variable electrical resistance for the purpose of converting mechanical force or motion into corresponding electrical variations.

Another object of the invention is the provision of an improved liquid cell having a variable electrical resistance which has a high degree of sensitivity, accuracy and responsiveness, and which will maintain its calibration over a long period of time and assure the reproduction of the same results responsive to the same impulses irrespective of changes in atmospheric and other local conditions to which the device may be subjected.

Another object of the invention is the provision of an improved device of the class described, which has a substantially linear calibration curve in regard to the translation of variations in the application of force or other applied factors which are translated into variations in electrical resistance, and which is of low cost, simple in construction, easy to apply to existing structures and sturdy and durable under field conditions.

Another object of the invention is the provision of an improved variable resistance electrical cell which may be used for the following purposes:

(1) As a motion responsive device for the purpose of indicating, recording, or utilizing a mechanical motion by converting its variations into corresponding variations in electrical resistance.

(2) As a conversion unit for converting mechanical variations to electrical resistance variations for the purpose of making lineal measurements.

(3) As a vibration sensitive unit for the purpose of converting mechanical vibrations into electrical oscillations for observations, indication, recording or controlling other devices.

(4) As a microphone for the conversion of variations in sound waves into variable electrical impulses to be used for recording, transmitting or amplification.

(5) As a phonograph reproducing unit for the purpose of converting the mechanical movement of a phonograph needle into variations in the electrical resistance of the unit to produce corresponding changes in generation or transmission of electrical energy.

(6) As a pressure responsive pick-up for the purpose of converting pressure variations into electrical variations for indication on an electric meter or for recording the pressure variations by means of a suitable electrical recorder.

(7) As a force sensitive unit for the purpose of causing proportional variations in electrical energy responsive to the application of a mechanical force to the unit.

(8) As a weighing device for the purpose of indicating weight by translation of the thrust which is placed upon the unit by the subject into variations in electrical resistance or corresponding variations in potential current, which are proportional to the weight of the subject.

(9) As a linear accelerometer for the purpose of translating the effects of varying acceleration on a mass into variations of electrical resistance, potential or current for indicating or recording the changes of acceleration.

(10) As an angular accelerometer for the purpose of converting variations in rotary acceleration into changes in electrical resistance for the purpose of permitting observation, indicating or recording changes in angular acceleration.

(11) As a torque meter for the purpose of measuring the torque impressed upon a shaft by translating the variations in torque into variations of electrical resistance which may be indicated or recorded.

Other objects and advantages of the invention will be apparent from the following description and the accompanying drawings, in which similar characters of reference indicate similar parts throughout the several views.

Referring now to the four sheets of drawings accompanying this specification;

Figures 1, 2:
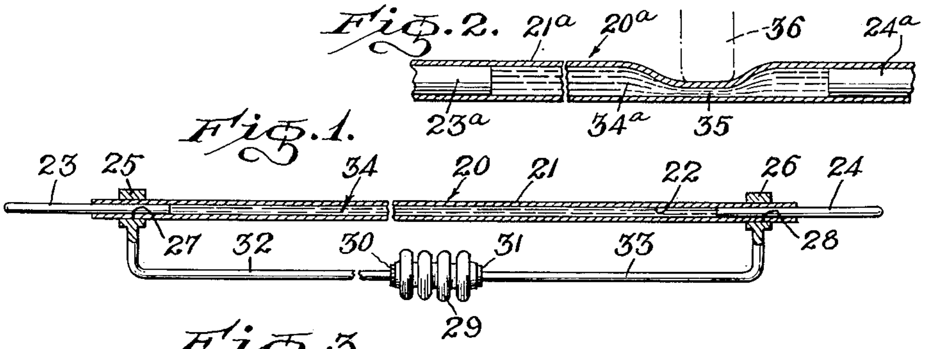
Fig. 1 is an axial fragmentary sectional view taken through an electro-mechanical cell of the simplest type embodying the invention, in which variations in length produce corresponding variations in electrical resistance.
Fig. 2 is a similar axial cross-sectional view taken through another form of simple cell, in which the variations in electrical resistance are produced by the application of force to the cell in such manner that the mechanical pressure deforms the wall of the cell and reduces the cross-sectional area of the cell to produce variations in electrical resistance.

Referring to Figure 1, the liquid cell 20 may consist of an elongated minute tube 21 of extensible and flexible resilient material, having an internal bore 22 which is preferably capillary in size. The bore 22 is preferably circular in shape and the outside of the tube 21 is preferably cylindrical in shape, and each end of the tube 21 is closed by means of cylindrical metal electrodes 23 and 24, having a tight frictional fit in the bore 22 and also secured therein by means of cement of the same material of which the tube 21 is made, or a cellulose acetate cement.

In addition each electrode 23, 24 is clamped in the end of the tube 21 by means of a supporting and clamping member 25, 26, having a cylindrical bore 27, 28, and the supporting members 25, 26 may be employed for increasing or decreasing the length of the cell 20 by varying the spacing between the members 25, 26 in accordance with the mechanical force, pressure or lineal measurement which is to be varied and the variations of which are to be converted into variations in electrical resistance. Various modes of applying force or pressure to the element 20 may be used, and by way of illustration a bellows pressure responsive element or thermostat 29 has its relatively movable ends 30, 31 fixedly secured by means of columns 32, 33 to the supporting members 25, 26, so that increase of pressure in the bellows member 29 increases the tension on the tubular element 21, tending to elongate it and reduce its cross-sectional area, thus reducing the size of the bore 22.

The bore 22 may be filled with a liquid filler 34, such as liquid mercury, a colloidal solution of silver or a weak acid solution such as sulphuric acid, or a weak alkali solution. Any electrical conducting liquid may be employed and those mentioned are merely exemplary of some that may be used. By changing the kind of liquid used elements of the same size, utilizing the same size of tube may be provided, having widely varying resistances, from a fraction of an ohm to thousands of ohms.

The material of which the tubular member 21 is made preferably consists of an electrical insulating initially plastic substance which is chemically inert, flexible and resilient, so that it tends to regain its former length after it has been stretched, and increased in length due to the application of a force such as a polyamide resin ("nylon"), polystyrene, methyl methacrylate, vinyl chloride-acetate and polyvinyl butyral.

The operation of the cell 20 is as follows:

When the tubular member 21 is elongated or increased in length it decreases in diameter. The electrical resistance of the conducting path between the electrodes 23, 24 is increased partly due to the increase in length and partly due to the decrease in cross-sectional area.

The variation in electrical resistance or conductivity is directly proportional to the variation in elongation or to the application of force or pressure, tending to elongate the cell 20 and, therefore, mechanical forces or pressures or vibrations applied to the cell 20 may be translated into variations in the electrical resistance which is interposed between the electrodes 23, 24.

Referring to Figure 2, the cell 20a in this case comprises a similar tubular member 21a, provided with an electrically conducting liquid filling 34a and with electrodes 23a and 24a. In this case the reduction in cross-sectional area of the tube 21a is made at the restriction 35 by the application of a thrust member 36, which engages the side wall of the tube 21a and flattens the tube and forms a restriction at 35 for diminishing the cross-sectional area and, therefore, increasing the electrical resistance which is interposed between the electrodes 23a and 24a.

Figure 3:
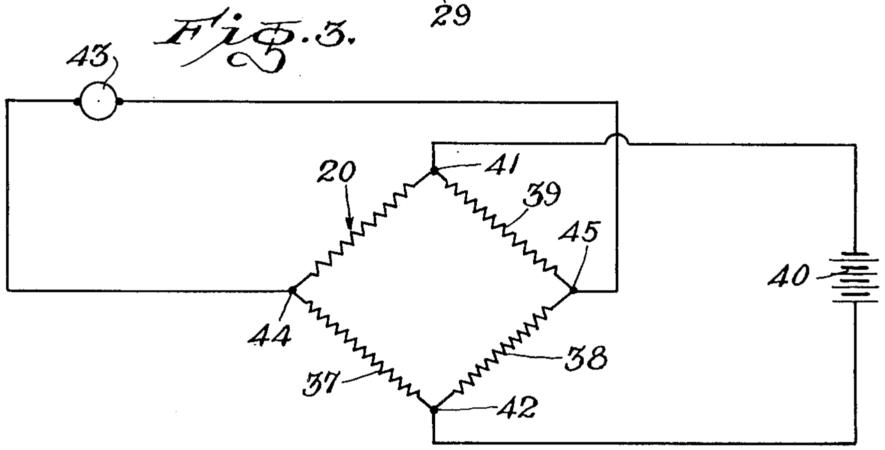
Fig. 3 is a simple bridge circuit which is to be employed with Figure 1 or 2 for indicating electrically the variations in electrical resistance that are produced in the cells of Figure 1 or Figure 2.

Referring to Figure 3, this is a wiring diagram of a Wheatstone bridge, which circuit may be employed with three fixed resistances 37, 38, 39, and the variable resistance cell 20 for the purpose of measuring or indicating or recording the variations in electrical resistance produced by the application of pressure or force to the cell 20.

An electromotive force is applied by means of the battery 40, which is applied across the junctures 41 and 42, and the resulting unbalance in the circuit is read at the galvanometer 43 which is applied across the junctures 44, 45.

Figure 4:
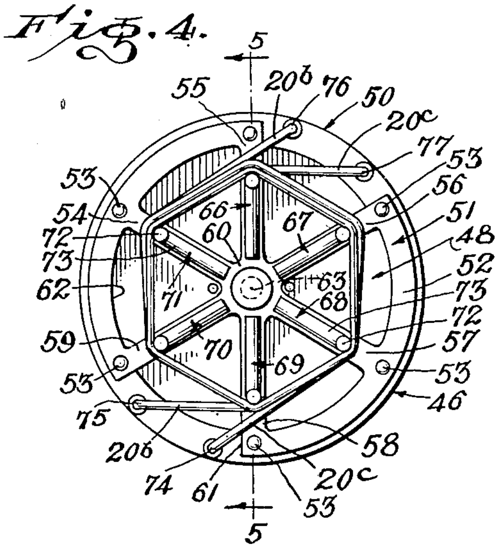
Fig. 4 is a front elevational view of an improved variable resistance device embodying and supporting an elongated liquid cell of the type of Figure 1, in such manner that minute variations in force motion or pressure are translated into variations of electrical resistance with great sensitivity and fidelity.
Figure 5:
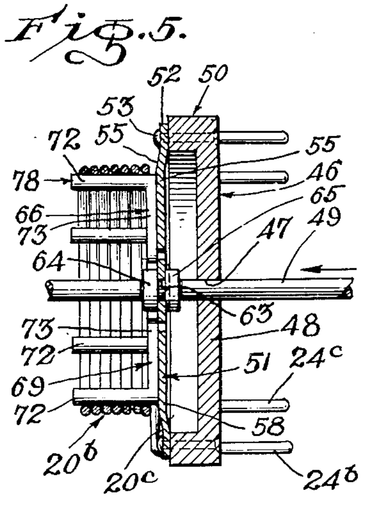
Fig. 5 is a sectional view taken on the plane of the line 5—5 of Figure 4, looking in the direction of the arrows.

Referring to Figures 4 and 5, these are views of a practical embodiment of the invention in which 46 indicates an insulating support, such as a molded insulating cup of circular shape provided with a cylindrical bore 47 centrally located in its bottom 48 for slidably supporting an actuating rod 49.

The cylindrical side wall 50 of the cup supports a resilient metal spider 51, which has an annular supporting flange 52 that is secured to the side wall 50 by a plurality of rivets 53, or in some cases the spider 51 may be brazed or welded to the support 46.

Spider 51 supports, by means of its annular supporting flange 52, a plurality of radially extending resilient spokes 54—59, which are joined together at a central circular portion 60. The annular supporting flange 52 is cut away at 61 between the spokes 58 and 59 to provide a space through which the terminals of the element may extend. The spokes 54—59 are separated by substantially triangular apertures 62, and the central supporting body 60 is provided with a circular bore 63.

The actuating rod 49 may have a threaded portion and may be provided with a pair of clamping nuts 64, 65 on either side of the spider 51 so that rod 49 may extend through apertures 63 and may be fixedly secured to the central spider portion 60. In other embodiments of the invention the members 64, 65 may comprise washers soldered or brazed to the portion 60 and to the rod 49.

Each of the spokes 54—59 carries an angular cantilever member 66—71, each of which has two arms 72, 73 at right angles to each other. The arm 73 extends parallel to one of the spokes, such as spoke 55, to which it is secured by riveting, welding, soldering, brazing or other suitable securing means, with the arms 72 of the cantilever members arranged at the same radial distance from the axis of the spider 51.

A pair of liquid cells 20b and 20c, like the liquid cell 20, previously described, have one of their ends passing through bores 74, 75 in the body 50, and provided with terminals 24b, 24c. Thereafter the liquid cells 20b, 20c are wrapped helically about the projecting arms 72 of the cantilever members 66—71 in a plurality of coils which assume a hexagonal shape, thus disposing of a considerable length of the liquid cells in a relatively small space.

The ends of the liquid cells 20b, 20c pass from the coil assembly through bores 76, 77 in the housing member 50, and are provided with the opposite terminals like the terminal 23, Figure 1. In the drawings, Figures 4 and 5, the coils of the liquid cells 20b and 20c are shown distributed over the arms 72 of the cantilever members, but in actual practice it may be desirable to utilize only those coils which are located near the ends 78 of the arms 72, where the movement of these arms is greatest. Thus the coils are preferably concentrated near the ends of the arms 72.

The liquid cell members 20b and 20c may then be connected in place of the resistance element 20, in Figure 3, and the resistance element 39, in Figure 3, forming two of the branches of the Wheatstone bridge, the resistance of which will be simultaneously varied.

The operation of the devices of Figures 4 and 5 are as follows:

When an axial force is applied to the actuating the rod 49, such as toward the left in Figure 5, as indicated by the arrow, the spider 51 flexes at the outer ends of its spokes and the central portion 60 moves toward the left causing the cantilever members 66—71 to rotate slightly upon a pivot, which may be assumed to be the angular corner of each cantilever member.

Thus the cantilever member 66 rotates clockwise, while the cantilever member 69 rotates counterclockwise in Figure 5, and the movement of the arms 73 toward the left causes the arms 72 to spread from each other. This spreading causes an elongation of the liquid cells 20b, and 20c, thus elongating the conducting path 34 in the liquid cells and also reducing the cross-sectional area of this liquid path so that the electrical resistance of each liquid cell is increased substantially proportionally to the amount of movement of the actuating rod 49.

Upon movement of the actuating rod 49 in the opposite direction the electrical resistance of the liquid cells 20b, 20c is proportionally increased relative to the amount of movement of the actuating rod, and the elasticity of the tubular element 21 causes the liquid cell to resume its former length with increased diameter when the rod 49 is moved toward the right again. When such a device is connected in the circuit of Figure 3, as described, the variations in electrical resistance will be indicated upon the galvanometer 43.

Figures 6, 7, 8, 9, 10:
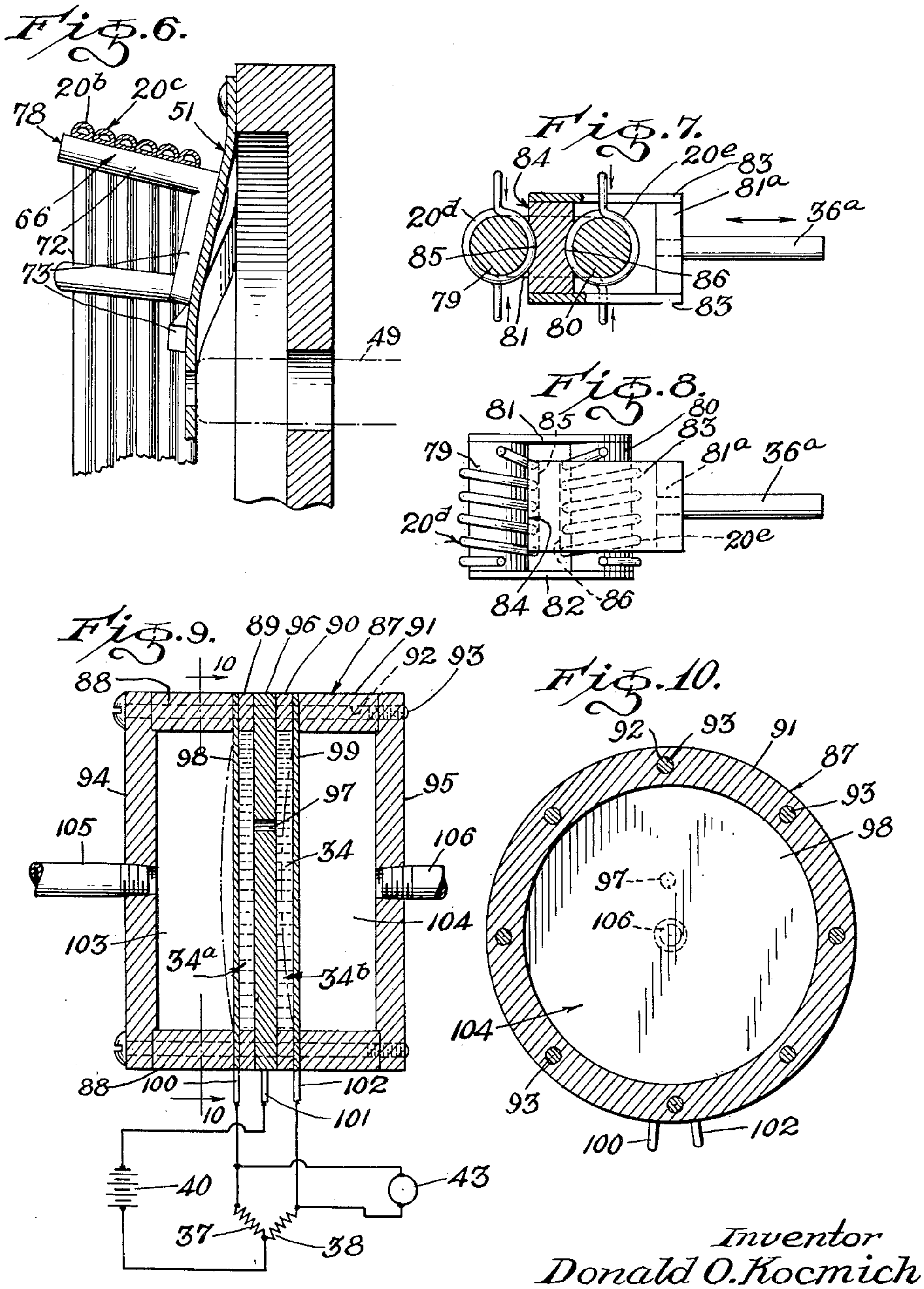
Fig. 6 is a fragmentary sectional view similar to Figure 5, showing how the application of force or motion to the device of Figure 5 elongates the liquid cell.
Fig. 7 is a fragmentary top plan view of a pressure responsive device in which variations in electrical resistance are produced by deforming the side walls of the liquid cell to vary the electrical resistance.
Fig. 8 is a side elevational view of the device of Figure 7.
Fig. 9 is an axial sectional view taken through a pressure sensitive pick-up embodying the invention, which is particularly adapted to measure differentials in pressure.
Fig. 10 is an end elevational view of the device of Figure 9.

Referring now to Figure 6, this is a fragmentary sectional view similar to Figure 5, exaggerating the degree of movement of the cantilever members, such as number 66, and illustrating the way in which the spider 51 flexes responsive to the application of force by rod 49 to stretch the liquid cells 20b, 20c.

A differential action between the changes of resistance in the liquid cells 20b, 20c may be secured by concentrating one liquid cell 20b outwardly toward the ends 78 of the arms 72, and concentrating the liquid element 20c inwardly of the ends of the arm 72, where the amount of movement is smaller.

Referring to Figures 7 and 8, these show a modification in which the liquid elements 20d and 20e are helically coiled about rigid cylinders 79 and 80. These rigid cylinders are fixedly secured to a pair of transversely extending frame members 81, 82 at their ends, one ot these frame members being mounted upon a suitable base or support.

An actuating rod 36a has its end rigidly secured to the cross-head 81a, which carries a pair of longitudinally extending struts 83, 83. The struts 83, 83 are rigidly secured to a pressure head 84, comprising a transverse bar which is formed with partially cylindrical grooves 85, 86, corresponding to the external radius of the coils of the liquid elements 20d, 20e. These liquid elements are provided with the same suitable terminals (not shown), and the operation of this modification is as follows:

When the rod 36a is acted on by force toward the left, the liquid element 20d is compressed and restricted at the groove 85, after the manner shown in Figure 2, with the restriction 35 caused by the member 36.

The pressure head 84 may be large enough to place an initial compression on both of the liquid elements 20d, 20e, so that as the pressure head 84 moves to one side, one liquid element 20d is restricted while the restriction is removed from the other liquid element.

Thus the electrical resistance of the two liquid elements 20d and 20e will be varied proportional to the movement of the actuating rod 36a, but the resistance of one will be increased as the resistance of the other is decreased, thus accentuating the effect of the change of resistance when these elements are connected in the Wheatstone bridge circuit of Figure 3 in place of the resistances 20 and 39.

Referring to Figures 9 and 10, these views show a modification in which the change of resistance is proportional to variations in pressure. The liquid-tight housing 87 may be made of insulating material, and its side wall comprises a plurality of annular members 88, 89, 90 and 91 provided with through bores 92 for receiving the securing bolts 93.

The securing bolts 93 also pass through the circular end plates 94, 95 of the housing 87, and may be threaded into the end plate 95. The central electrode 96 comprises a circular disc having a through aperture 97, and this disc is clamped between the annular members 89 and 90, which in turn are engaged by imperforate flexible diaphragms 98, 99, also circular in shape, and provided with bores 92 for passing bolts 93. Suitable gaskets may, of course, be employed where preferred instead of making a ground fit.

The space between the diaphragms 98, 99, also including aperture 97, may be substantially filled with an electrical conducting fluid 34, such as that previously described, and the diaphragms and central electrode 96 are provided with terminals 100—102. The annular members 88, 91 with the end plates 94, 95 form pressure chambers 103, 104 outside of each diaphragm 98, 99, and the end plates are provided with conduits 105, 106, for connection to sources of pressure, such as, for example, the ends of a differential manometer.

It will be observed that this device is connected in circuit in Figure 9 with a Wheatstone bridge similar to Figure 3, in which the electrical resistance of the conducting fluid 34a takes the place of the resistance 20 of Figure 3, and the conducting fluid in the space 34b takes the place of the resistance 39.

The operation of this modification is as follows:

Upon increase of pressure in the chamber 103, diaphragm 98 flexes toward the right, driving the conducting liquid through the aperture 97 into the space 34b. Assuming that there is a corresponding decrease in pressure in the chamber 104, diaphragm 99 will flex toward the right, and the resistance path from diaphragm 98 to the central electrode 96 will be decreased in length while the resistance path from central electrode 96 to diaphragm 99 will be increased in length, thus varying the resistance in two branches of the Wheatstone bridge circuit inversely to each other and substantially proportional to the variations in pressure impressed on the diaphragms.

Figures 11, 12:
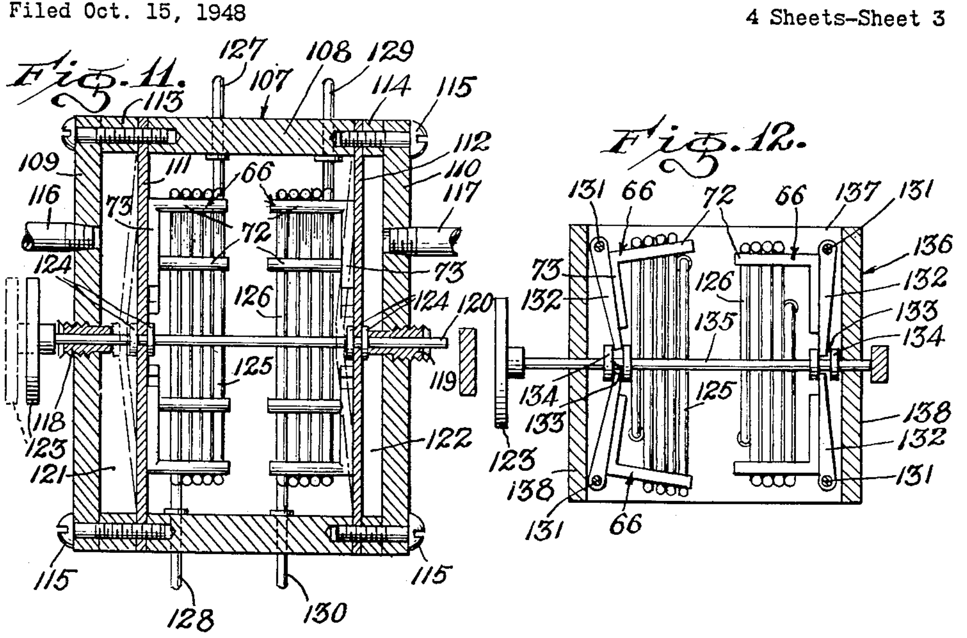
Fig. 11 is an axial sectional view taken through a modified form of device similar to Figures 4 and 5, but employing a pair of liquid cells for the purpose of accentuating the variations in electrical resistance which are produced responsive to the application of force or motion to the device.
Fig. 12 is a fragmentary sectional view of a device like Figure 11, showing the position of the parts when force is applied at the left end of the controlling member.

Referring to Figures 11 and 12, these show another modification similar to Figures 4 and 5, except that the actuating rod acts upon two liquid elements with a reverse effect on one element relative to the other. This device preferably includes a housing 107, which may have a substantially cylindrical side wall 108 and a pair of end plates 109, 110. The side wall 108 supports a pair of diaphragms 111 and 112, which are clamped against the side wall by the annular member 113, 114.

The annular members 113, 114 are engaged by the end plates 109, 110 and secured by screw bolts 115, which pass through the end plates, annular members, diaphragms, and are threaded into the side wall 108. The end plates have conduits 116, 117 for connection to a source of fluid pressure which may be a liquid or a gaseous medium.

The end plates are also provided with packing glands 118, 119 for passing the actuating rod 120 and for preventing leakage along the rod from the fluid pressure chambers 121, 122. The actuating rod may be provided with a knob 123 on one or both ends, and actuating rod 120 is provided with washers 124 on both sides of the two diaphragms 111, 112, the rod passing through the diaphragms and being brazed or soldered to the diaphragms with the washers in such manner that the diaphragms are imperforate and leak-proof Each diaphragm carries directly on its inner surface a plurality of the angular cantilever members 66, previously described, these having their arms 73 welded, brazed or soldered directly to the metal diaphragm and the contilever members 66 are arranged, as shown in Figure 4, to form a regular polygon. A separate liquid element 125 and 126 is wrapped around the projecting arms 72 of the cantilever members 66, and the ends of the liquid element are brought out through bores in the side wall 107 and provided with terminals 127—130. The rod 120 may be cut off on the outside of each diaphragm 111, 112 so that the only purpose of the rod is to connect the diaphragms. The plugs 118, 119 would then be imperforate and they would serve as adjustable stop members for determining the amount of movement of the diaphragms and for preventing them from being strained too far.

The present device is responsive both to fluid pressure and to direct application of force to the diaphragms by means of the rod 120. The cantilever members 66 face in opposite directions, opposing each other on the two diaphragms and, therefore, as the one liquid element 125 is stretched and increased in resistance, as shown in Figure 12, the other liquid element 126 is relieved of strain and permitted to contract to a shorter length. Thus the two elements 125, 126 may form the resistance branches 20 and 39 of the Wheatstone bridge circuit of Figure 3, and since one element increases in resistance as the other decreases, the effect of the variations of resistance will be accentuated.

The device of Figure 11 has the advantage that it provides automatic electric temperature compensation. Since both of the legs of the Wheatstone bridge will be of the same temperature, there will be no changes in resistance due to changes in temperature. Since mercury, when used as the liquid in the resistance element, expands upon increase of temperature, it is important that both of the resistance elements employed are at the same temperature. Devices which employ electrical resistance wires vary in their resistance according to their co-efficient of temperature change of resistance, but the present devices have automatic compensation for both mechanical and electrical resistance changes.

Figure 12 illustrates a further modification over that of Figure 11, in that the diaphragms are eliminated and the cantilever members 66 are pivotally mounted at 131 on levers 132, which have their ends engaging in the annular slot 133 of a collar 134, carried by the actuating rod 135. In this case the supporting member 136 may consist of an open frame or a housing, having a cylindrical side wall 137 and end plates 138.

The operation of the device of Figure 12 is similar to that of Figure 11, except that it is actuated solely by the forces or vibrations applied to the rod 135.

The knob 123 may constitute a mass, the inertia of which tends to cause it to stand still when the device of Figure 12 is subjected to lineal acceleration. Thus this device may be used to produce changes of electrical resistance which are proportional to lineal acceleration.

Figures 13, 15:
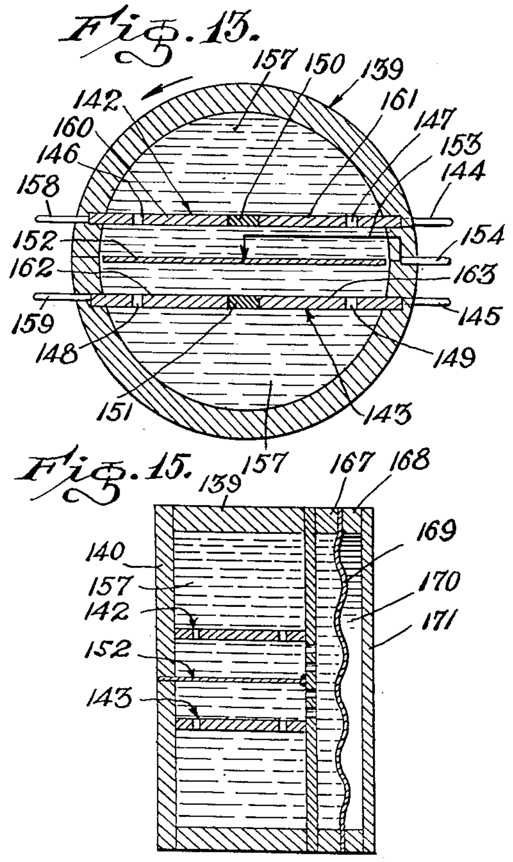
Fig. 13 is a transverse sectional view through a device for a measuring angular acceleration.
Fig. 15 is a view similar to Figure 14, of a modified form of that device in which provision is made for taking up expansion and contraction in the liquid due to changes in temperature.
Figure 14:
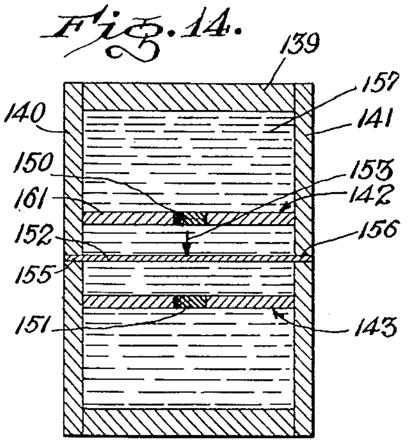
Fig. 14 is an axial sectional view through the device of Figure 13.

Referring to Figures 13 and 14, these are views of another modification, comprising a device which is actuated responsive to angular inertia and which produces variations in resistance which are proportional to the acceleration applied to the device.

Referring to Figure 13, 139 indicates a cylindrical side wall of insulating material, its open ends being closed by end plates 140, 141. The cylindrical side wall 139 may be slotted to receive the perforated metallic partitions 142, 143, provided with the apertures 146—149. Each metallic partition 142, 143 consists of two parts separated by a diametrically opposing strip of insulation 150, 151, and each part of the partition is provided with the laterally extending projecting terminals 144, 145, 158, 159.

A thin metal vane 152 is rotatably mounted midway between the partition electrodes 142, 143 and is connected by means of an insulated conductor 153 to a terminal 154. The vane 152 may be supported by resilient extensions 155, 156, mounted in slots in the end plates 140, 141, in such manner that the vane is biased to the central position, shown in Figure 13, but it may be turned against the action of its resilient supports 155, 156 relative to the fixed partitions 142, 143.

Again the housing 139 is filled with an electrically conducting liquid 157 and the operation of this device is as follows:

When the device is rotated upon its axis, starting from a still position, it must be given an angular acceleration to arrive at a predetermined speed. As the housing 139 rotates the electrically conducting liquid 157 tends to maintain its state of rest.

Assuming the rotation is counterclockwise, as shown in Figure 13, while the housing 139 is being accelerated the liquid 157 moves in a contrary direction, that is clockwise, relative to the housing and acts on the vane 152 to move it clockwise. This brings the ends of the vane 152 closer to the partitions 142, 143, reducing the length of the electrical path through the conducting liquid 157, and varying the electrical resistance of the path through the electrical conducting liquid.

The left half of the partition 142 may be indicated by 160, and the right half by the numeral 161. The left half of partition 143 may be indicated by 162 and the right half by numeral 163.

Figures 16, 17, 18, 19, 20, 21:
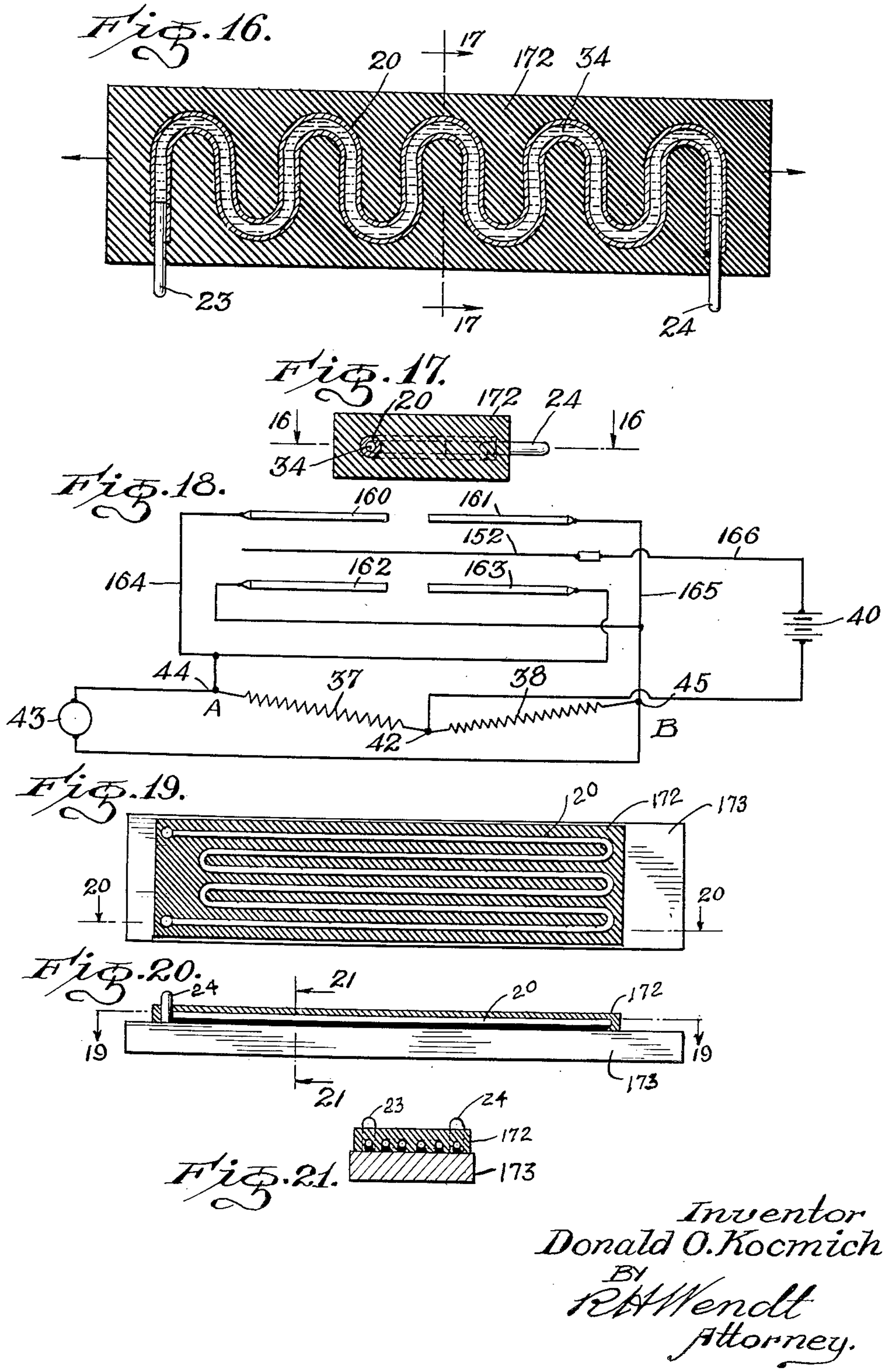
Fig. 16 is a sectional view taken on the plane of the line 16—16 of Figure 17, looking in the direction of the arrows, showing the structure of an extensible or compressible support for a liquid cell having an extended length by reason of which its sensitivity may be increased.
Fig. 17 is a transverse sectional view of the device of Figure 16, taken on the plane of the line 17—17.
Fig. 18 is a wiring diagram showing the elements of the device of Figure 13 connected in circuit.
Fig. 19 is a plan view of another extensible and contractible body in which the resistance element is arranged to extend longitudinally for maximum expansion and contraction.
Fig. 20 is a side elevational view of the device of Figure 19, attached to a solid material for the purpose of indicating changes in length or indicating the expansion or contraction of the material.
Fig. 21 is a sectional view of the device of Figure 20, taken on the plane of the line 21—21, looking in the direction of the arrows.

Referring to Figure 18, this is a wiring diagram showing the electrodes bearing the same numerals. The electrodes 160 and 163 are connected by a conductor 164, so that the path between these two electrodes and the central vane 152 through the conducting liquid may form one of the resistances of the Wheatstone bridge. The conductor 164 is, therefore, connected to the junction A. The electrodes 162 and 161 are connected together by a conductor 165, which is connected by junction B.

The path through the electrical conducting liquid from electrodes 161 and 162 to the vane 152 constitutes another resistance of the Wheatstone bridge. The vane 152 is connected by conductor 166 to the battery, and this vane constitutes the junction between the variable resistances represented by the two different paths of the current through the conducting liquid, this junction corresponding to junction 41 of Figure 3.

Therefore the action in the Wheatstone bridge is as follows:

When the inertia of the liquid in the housing 139 causes the vane 152 to approach electrodes 160 and 163, the resistance path through the liquid between these electrodes is decreased, causing a decrease in that branch of the bridge which corresponds to the resistance 20 of Figure 3.

At the same time this movement of the vane 152 moves it farther away from the electrodes 161, 162, increasing the resistance path through the liquid from these electrodes to the vane. This is equivalent to an increase in the resistance of the resistance 39 of Figure 3. Thus the device of Figures 13 and 14 embodies two separate resistance paths which vary inversely, one to the other, and proportional to the angular acceleration which is applied to the device.

Referring to Figure 15, this is a modification of Figures 13 and 14, in which the parts are provided with similar numbers. The left part of this device corresponds to Figure 14, to which there has been added a pair of annular outer wall members 167, 168, clamping a diaphragm 169 an forming an air chamber 170 by means of the end plate 171. This device works the same as Figures 13 and 14, but the diaphragm 169 is included to permit the liquid used to expand and contract under varying heat conditions.

Referring to Figures 16, 17 and 19, these show a modification in which one of the liquid elements 20 is bent into sinuous form and imbedded in a block 172 of resilient extensible material, such as rubber or nylon. In Figure 16 the block has been extended by the application of a longitudinal force acting in opposite directions on the end of the block.

When such a resilient block is extended the sinuous liquid element 20 is stretched and its cross-sectional area reduced, thereby increasing the length of the resistance path through the liquid 34 which it contains, and also decreasing the cross-sectional area of the liquid so that extension of the block 172 increases the resistance proportional to the amount of extension. Thus variations in length may be made to produce corresponding variations in electrical resistance in the device of Figures 16 and 17.

In Figure 19 the resistance element has been arranged so that its major portions extend longitudinally of the block of resilient extensible material, thus securing a maximum extension and contraction of the resistance element, upon stretching or contracting of the block.

Referring to Figure 20, this is a side elevation of an element such as shown in Figure 19, applied to a block of solid material, such as, for example, a steel structural member, by means of a suitable cement such as cellulose acetate cement. The electrical resistance element then takes the characteristics of the solid material so far as expansion and contraction is concerned, and it may be used to determine changes in length or changes in temperature, or by measuring changes in resistance to determine the condition of stress or strain in the solid material. The force required to stretch the element itself is negligible as compared with the forces acting on the solid material, 173.

Figure 21 shows a cross-sectional view of the assembly of Figure 20, showing how a multiplicity of lengths of the resistance element may be arranged in one block or strip of resilient material, as shown in Figure 19.

It will thus be observed that I have invented a plurality of different forms of a device, including a tubular, extensible insulating sheath filled with an electrical conducting liquid and provided with electrodes at each of its ends so that extension of the length of the element causes variations in resistance.

The present device accurately reproduces, by means of varying the electrical resistance of a liquid path, small mechanical changes that are impressed upon the device. It may be made to indicate variations in resistance responsive to mechanical motion, increases in length, vibration, sound waves, sound reproduction, pressure variations, variations in weight, linear acceleration, angular acceleration, and torque.

The present devices maintain their calibration over a long period of time, and the relation between variations in resistance and the variations in the amount of force applied, pressure or change of dimension is directly proportional one to the other.

The present devices are very sensitive and are not affected by changes in atmospheric or other conditions and may, therefore, be used under all kinds of temperature and weather conditions.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an electrical resistance device, the combination of a strip of resilient, stretchable and deformable material, with a pair of electrical terminals carried by said material, the said strip being provided with a multiplicity of sinuous channels in series with each other and providing a continuous channel from one terminal to the other terminal, and a filling of electrically conductive liquid in said continuous channel extending from one terminal to the other, the extension of said strip of resilient material causing an extension and a resultant diminution in cross section of the longitudinally extending portions of said channels, which reduces the cross section of the electrical conducting material and increases the resistance, proportional to the extension of said resilient material.

2. In an electrical resistance device, the combination of a strip of resilient, stretchable and deformable material, with a pair of electrical terminals carried by said material, the said strip being provided with a multiplicity of sinuous channels in series with each other and providing a continuous channel from one terminal to the other terminal, and a filling of electrically conductive liquid in said continuous channel extending from one terminal to the other, the extension of said strip of resilient material causing an extension and a resultant diminution in cross section of the longitudinally extending portions of said channels, which reduces the cross section of the electrical conducting material and increases the resistance, proportional to the extension of said resilient material, the said channel being in the form of a tube of resilient, stretchable and deformable material of capillary proportions imbedded in said strip and having the electrodes located in the ends of said tube.

3. In an electrical resistance device, the combination of a strip of resilient, stretchable and deformable material, with a pair of electrical terminals carried by said material, the said strip being provided with a multiplicity of sinuous channels in series with each other and providing a continuous channel from one terminal to the other terminal, and a filling of electrically conductive liquid in said continuous channel extending from one terminal to the other, the extension of said strip of resilient material causing an extension and a resultant diminution in cross section of the longitudinally extending portions of said channels, which reduces the cross section of the electrical conducting material and increases the resistance, proportional to the extension of said resilient material, the said channels having elongated portions extending longitudinally of said strip and joined by relatively short U-shaped portions adjacent each end of the strip, so that the elongation of the strip acts upon the elongated portions of the channel.

4. In an electrical resistance device, the combination of a strip of resilient, stretchable and deformable material, with a pair of electrical terminals carried by said material, the said strip being provided with a multiplicity of sinuous channels in series with each other and providing a continuous channel from one terminal to the other terminal, and a filling of electrically conductive liquid in said continuous channel extending from one terminal to the other, the extension of said strip of resilient material causing an extension and a resultant diminution in cross section of the longitudinally extending portions of said channels, which reduces the cross section of the electrical conducting material and increases the resistance, proportional to the extension of said resilient material, the said strip being secured to an expansible metal member by being cemented thereto, so that the expansion of the metal member results in the change of resistance between the terminals and the force required to stretch the strip is negligible in comparison with the forces exerted by expansion of the metal member.

DONALD O. KOCMICH.

REFERENCES CITED

The following references are of record in the file of this patent:

UNITED STATES PATENTS

| Number | Name | Date |
|---|---|---|
| 1,447,026 | Lewin | Feb. 27, 1923 |
| 1,516,526 | Ganss | Nov. 25, 1924 |
| 1,614,774 | Bonine | Jan. 18, 1927 |
| 2,061,863 | Wells | Nov. 24, 1936 |
| 2,359,085 | Chubb | Sept. 26, 1944 |
| 2,391,966 | Harrison | Jan. 1, 1946 |
| 2,453,549 | Statham | Nov. 9, 1948 |
| 2,453,550 | Statham | Nov. 9, 1948 |
| 2,481,371 | Van Dyke | Sept. 6, 1949 |

FOREIGN PATENTS

| Number | Country | Date |
|---|---|---|
| 134,865 | Great Britain | Nov. 13, 1919 |
| 263,634 | Great Britain | Jan. 6, 1927 |
| 284,770 | Great Britain | Feb. 3, 1928 |
| 381,689 | Great Britain | Oct. 13, 1932 |